US010885070B2

(12) United States Patent
Kirk

(10) Patent No.: US 10,885,070 B2
(45) Date of Patent: Jan. 5, 2021

(54) DATA SEARCH METHOD AND DEVICE

(71) Applicant: MOBILE CONTENT MANAGEMENT SOLUTIONS LIMITED, Horsham (GB)

(72) Inventor: David O. W. Kirk, Horsham (GB)

(73) Assignee: MOBILE CONTENT MANAGEMENT SOLUTIONS LIMITED, West Sussex (GB)

(*) Notice: Subject to any disclaimer, the term of this patent is extended or adjusted under 35 U.S.C. 154(b) by 244 days.

(21) Appl. No.: 15/579,092

(22) PCT Filed: May 25, 2016

(86) PCT No.: PCT/GB2016/051508
§ 371 (c)(1),
(2) Date: Dec. 1, 2017

(87) PCT Pub. No.: WO2016/193671
PCT Pub. Date: Dec. 8, 2016

(65) Prior Publication Data
US 2018/0173787 A1 Jun. 21, 2018

(30) Foreign Application Priority Data
Jun. 1, 2015 (GB) .................................. 1509436.0

(51) Int. Cl.
*G06F 16/248* (2019.01)
*G06F 16/28* (2019.01)
(Continued)

(52) U.S. Cl.
CPC .......... *G06F 16/287* (2019.01); *G06F 16/248* (2019.01); *G06F 16/24578* (2019.01); *G06F 16/90* (2019.01); *G06Q 50/26* (2013.01)

(58) Field of Classification Search
CPC .... G06F 16/156; G06F 16/248; G06F 16/338; G06F 16/438; G06F 16/538;
(Continued)

(56) References Cited

U.S. PATENT DOCUMENTS 8,688,711 B1* 4/2014 Chevalier ........... G06F 16/9038
707/748
2006/0190432 A1* 8/2006 Wang ...................... G06F 16/26
(Continued)

FOREIGN PATENT DOCUMENTS

WO WO 2011/097294 A1 8/2011

OTHER PUBLICATIONS

The International Search report dated Jul. 27, 2016.
(Continued)

*Primary Examiner* — Robert W Beausoliel, Jr.
*Assistant Examiner* — Nirav K Khakhar
(74) *Attorney, Agent, or Firm* — Blank Rome LLP

(57) ABSTRACT

A data search method for computer forensic investigation comprising: inputting at least one pre-determined search term; searching a computer or digital device that is powered on in a forensically sound state for data matching one or more of the pre-determined search terms to identify target data from any of file names; strings; hash values or hash functions; installed programs; MAC and IP addresses; and/or metadata; and categorising the target data according to a pre-determined list of categories, wherein the categories are different to the search term/s and; wherein the data search method simultaneously searches for target data and categories the target data.

15 Claims, 6 Drawing Sheets

(51) Int. Cl.
  *G06F 16/2457* (2019.01)
  *G06F 16/90* (2019.01)
  *G06Q 50/26* (2012.01)

(58) Field of Classification Search
  CPC .... G06F 16/638; G06F 16/738; G06F 16/838;
       G06F 16/9038; G06F 16/9538
  USPC .................................................. 711/E12.103
  See application file for complete search history.

(56) References Cited

U.S. PATENT DOCUMENTS

2012/0322422 A1   12/2012  Frecks, Jr. et al.
2015/0278214 A1*  10/2015  Anand ................. G06F 16/338
                                              707/748

OTHER PUBLICATIONS

UKIPO Communication for GB1509436.0 dated Nov. 20, 2015.
Aduna AutoFocus5—Desktop search—Wikipedia, the free encyclopedia (1 page) https://en.wikipedia.org/wiki/Desktop_search(accessed on Nov. 27, 2015).
Aduna AutoFocus 5.0 (Linux) Free Download http://linux.freesoftware.site/aduna-autofocus-50-5655124b.html (accessed on Nov. 27, 2015).

* cited by examiner

DATA SEARCH METHOD AND DEVICE

The present invention relates to a data searching method and device. In particular, the present invention relates to a system for data storage/digital memory searching for use by the police, law enforcement, intelligence and military personnel and has particular application in the field of computer and digital forensics.

Investigations by police, law enforcement, intelligence and military personnel often require the acquisition of data by digital memory imaging, with the data acquired to be used as evidence in future proceedings. The applicant's earlier UK patent GB2503600 discloses an imaging device for computer forensics, which provides rapid, efficient and secure data extraction by dividing the storage of the digital memory across multiple removable data storage devices.

However, there remains a need to improve the efficiency of data extraction and the subsequent analysis for computer and digital device forensics investigations. Investigations often need to be completed quickly in the limited time available. Existing solutions have focused on providing the means to extract data more rapidly and also to allow for extraction of greater amounts of data. Hard drives are now capable of storing an increasingly large amount of data and it may only be a small portion of the data that is relevant to an investigation. However, existing computer forensic imaging processes and tools are configured for imaging and extracting all stored data for analysis at a later time using a separate tool. Known forensics tools use a multi-stage process of extracting data on site before the extracted data is loaded into a separate analysis tool. The necessary analysis is often time consuming and complex and, by extracting all data for analysis, is often a very laborious process. During the analysis stage, the nature of the data to be analysed requires investigators to be suitably trained both to identify the data that is relevant to the investigation and also to be prepared to view data which can include offensive text and images.

Known processes and tools and their associated devices for examining computers are inefficient and slow because they rely on a multi-stage process involving data extraction, loading onto an analysis tool prior to searching/viewing data. Existing systems often rely on the search skills of an investigator, which is prone to human error and is unreliable. It is common for it to take days or weeks to analyse a target device.

The present invention sets out to alleviate the problems described above by providing a data search method and device, which allows for rapid and secure data extraction.

In one aspect, the present invention provides a data search method for computer forensic investigation comprising:
  inputting at least one pre-determined search term;
  searching a computer or digital device that is powered on in a forensically sound state for data matching one or more of the pre-determined search terms to identify target data from any of file names; strings; hash values or hash functions; installed programs; MAC and IP addresses, and/or metadata; and
  categorising the target data according to a pre-determined list of categories, wherein the categories are different to the search term/s; and
  wherein the data search method simultaneously searches for target data and categorises the target data.

Preferably, the method further comprises the step of ranking the data according to a pre-determined hierarchy of categories.

Preferably, the computer is a digital data device, such as a personal computer; a laptop; a tablet computer; a Smart phone or similar mobile device.

Preferably, the method is for searching a computer or digital device that is powered on in a forensically sound boot environment.

It is envisaged that the present invention can also target devices such as Apple Mac systems; UNIX and LINUX systems; hard drives; digital storage mediums; removable media such as USB devices; eSata external drives; SD cards; and/or SD microcards; "roadmap" of cloud storage and back-ups.

Preferably, the pre-determined search term includes any of a keyword; a file date and/or time; or a file size.

It is understood that the "pre-determined" search term and the pre-determined list of categories are decided in advance of searching wherein the pre-determined search term is then set and fixed for that data search method. For example, the pre-determined search term can be input "off-site" by a first operator well in advance of the search being carried out. The search operator carrying out searching need have no knowledge of the pre-determined search term or the pre-determined list of categories.

Preferably, the data search method further comprises the step of listing the categorised target data.

Preferably, the data search method is for searching a computer for digital data, which is stored on any of a hard disc; a flash memory; random-access memory (RAM); or CPU cache.

The present invention allows for rapid, accurate and secure analysis of the digital content of a target computer without the need to remove the drive from the target computer or to unnecessarily analyse all of the data contained therein.

The present invention allows a user to quickly and accurately investigate a large target digital storage device and analyse only suspicious/target data using a single tool. Thus, the present invention decreases the amount of data that needs to be subsequently extracted and therefore analysed, which decreases the time involved and so the risk of interruption and/or detection during a covert operation. The investigation can also be carried out without an investigator needing to be trained in data analysis and without an investigator having to view suspicious data that is identified.

The present invention ensures that the data contained in a target computer is unaltered by the search and matching process so that the integrity of the data on the target computer is preserved, to maintain the target computer in a forensically sound state. By significantly improving the speed and efficiency of data searching and extraction, the present invention allows for an increased rate of data transfer; a faster investigation and so a faster conviction process.

The present invention greatly improves the accuracy of data searches by reducing the risk of human error and can provide a definitive result as to whether target data is present and to which category it is allocated usually within minutes. This rapid and accurate result can be achieved by a user unskilled in computer forensics, without requiring them to have knowledge of the search; to view data or to provide input to the analysis beyond obeying very simple instructions.

Preferably, the data search method further comprises the step of extracting data.

To provide a rapid and easily understood analysis according to the data search it has been found that categorising the data allows the search results to be easy to understand, especially to any un-trained user or when there is very limited time available to process target data and understand the search results. For example, a user is able to see that "known illegal images" or "known terrorism content" has been found by the search. The present invention allows for categorisation criteria to be fixed/pre-set and the method of the present invention sorts the data simultaneously with categorisation. The present method improves the speed, efficiency and accuracy of searching, and so reduces the time and complexity in formatting and processing the target data to reduce the risk of failure and ensure that all necessary target data can be searched in the available time, which is often restricted in covert (and overt) forensic investigations. A user is then able to further sort the data within each category by appropriately tagging them. It is to be understood that the category to which the extracted data is allocated is different to the search term. Each category has one or more search terms allocated to it.

Preferably, the data is extracted to one or more removable data storage devices.

Preferably, the or each removable data storage device comprises any combination of a USB; eSata external drive; SD card; SD micro card; FireWire drive; and/or Thunderbolt drive.

Preferably, the data search method further comprises the step of displaying an indicator to indicate that data matching one or more of the pre-determined search terms, i.e. that target data has been identified.

By displaying an indicator as the data is searched, the user can gain a visual indication of whether the target device is of concern, as well as the level of concern, without a user needing to be skilled in computer forensics or without a user having to analyse or view a large amount of data. For example, a traffic light system of red, amber and green indicators is used, whereby a green indicator will allow an investigator to quickly dismiss a target device and move on to a further target device.

In the event of a red indicator, the user or operator at this stage can either allow the extraction to complete or can stop the extraction process and store all previously searched data up to the point of termination with the full knowledge that the device contains material or content of the highest priority and, so, of a serious nature (such as criminal or terrorist content). The ability to efficiently and quickly identify high priority target data and provide an early alert, usually within about one to two minutes of the search commencing, is a key advantage in the time critical application of the present invention in computer forensic investigations; particularly, when investigations can involve life threatening situations. For example, allowing a military user to identify digital device containing mission critical data in such a short space of time is highly valuable. The user is able to also identify medium priority (amber) data in a very short space of time; this allowing the user or operator to act quickly when required.

It has been found that the data search method is of great value in providing categorised data almost instantly to a user because the rate of data transfer is so dramatically increased. Furthermore, the categorisation is effectively "auto-produced" without requiring any post-extraction analysis. The data is categorised without affecting the integrity of the data, which remains forensically sound and suitable for court level reporting.

The present invention is of great value in operations targeting multiple computers, by significantly reducing the number of devices that need to be seized and analysed. The present invention does not only provide a rapid visual indicator of target data identified but is a novel and inventive method to ensure that all target data is accurately and efficiently identified whilst maintaining a forensically sound state.

Alternatively, a written indicator can be generated to show a user whether the data search has identified data that is high, low or medium priority.

In a second aspect, the invention provides a data search device for computer forensic investigation comprising: an input for inputting at least one pre-determined search term; a search means for searching a computer or digital device that is powered on in a forensically sound state for data matching one or more of the pre-determined search terms to identify target data from any of file names; strings; hash values or hash functions; installed programs; MAC and IP addresses; and/or metadata; a categorising means for categorising the target data according to a pre-determined list of categories; wherein the categories are different to the search term/s.

Preferably, the data search device further comprises a listing means for listing the categorised target data.

Preferably, the data search device further comprises an extractor for extracting data.

More preferably, the data search device comprises an extractor for extracting data to one or more removable storage devices.

Preferably, the data search device comprises a display for displaying an indicator according to the category of the target data.

For the purposes of clarity and a concise description, features are described herein as part of the same or separate embodiments; however it will be appreciated that the scope of the technology may include embodiments having combinations of all or some of the features described.

These and other characteristics of the present technology will be more fully understood by reference to the following detailed description in conjunction with the attached drawings, in which.

Figure 1:
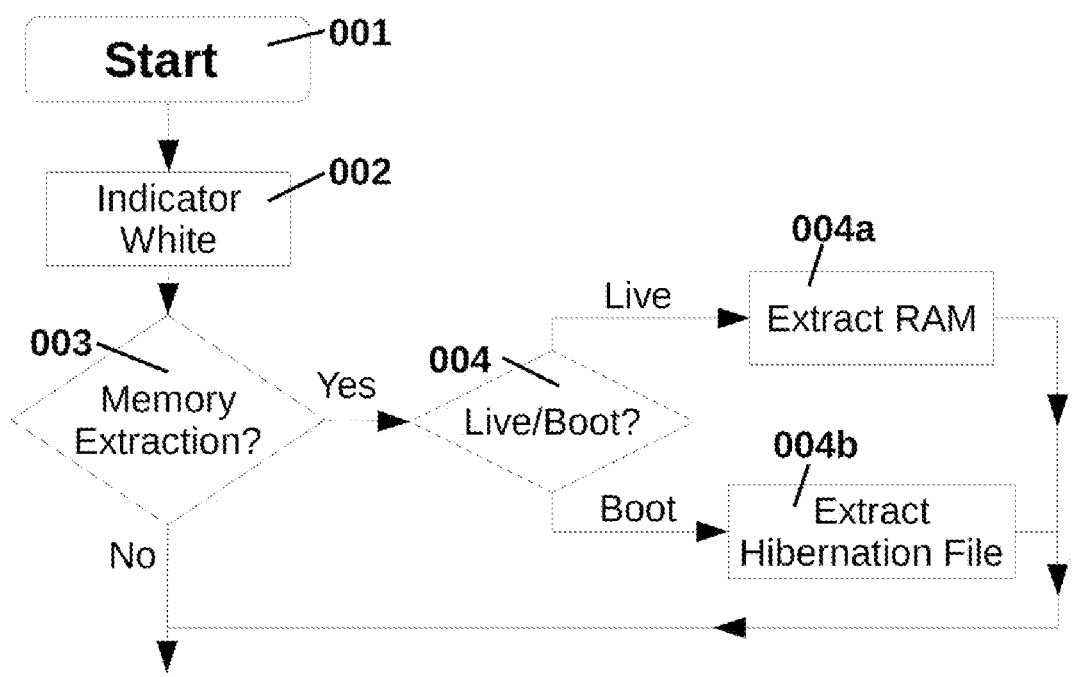
FIG. 1 is an extract of a flow diagram illustrating a first stage of the method of the present invention establishing the environment of the digital data device.

The figures described herein, wherein like parts are designated by like reference numerals throughout; illustrate example embodiments of a method and device according to the present invention. Although the present technology will be described with reference to the example embodiments shown in the figures, it should be understood that many alternative forms can embody the present technology.

Referring to FIG. 1, prior to starting the search; for example "on site" in a covert investigation; a user predetermines any required criteria of the data that is to be searched for. The user predetermining the fixed search criteria may be a different user to the investigator carrying out the "on-site" search. This can include a pre-determined list of keywords; for example of file names; specific strings; hash values or functions; installed programs, MAC and IP addresses etc. The "target data" that has been identified by the search method of the present invention can later be input to an off-site software package and displayed in the form of a table or database.

The present invention also allows for the "target data" to be simultaneously assigned a priority or category according to the type and/or importance of the data that is to be searched for. A user pre-determines the target data of interest and the category and/or priority to which the target data is to be assigned. The user pre-determining the category and/or priority may be a different user to the "on-site" investigator. For example, a user can categorise data to be "category 9", such that when a red indicator is given to show that target data is found, a user can also see from a display details of the match that has been found and the associated category. The method processes target data to compile a categorised output, rapidly and efficiently, minimising the risk of data extraction failure and streamlining the amount of data that needs to be extracted. It has been found that for the majority of searches, the data search method searches a computer/digital device and categorises data to give all amber (medium priority) indicators in less than about one minute and can guarantee that all amber indicators are output in less than about two minutes. For the majority of searches, the data search method searches a computer/digital device and categorises data to give all red (high priority) indicators in less than about two minute and can guarantee that all red indicators are output in less than about five minutes.

The user pre-determining the category and/or priority may be a different user to the "on-site" investigator. The category and priority are understood to be different to the search term/s. Each search term being a subset of a category and each category being allocated one of a multiple of priority options.

The method also enables a user to predetermine that an alert is to be given if any evidence indicating that the device owner has attempted to block access has been identified. An amber indicator is used to show that data encryption has been identified or that a keyword of interest has been used to label a file. In alternative embodiments of the invention, further categories of target data can be pre-determined according to the requirements of the user.

In the configuration of the data search method and device prior to searching, a user is prompted to input their requirements for the search that is to be carried out. For example, the user selects one or more of the "tasks" that should be run, including options for Ram Extraction; System Profile extraction; or Internet History Scan. A user is also prompted to pre-select the type of extraction required. For example, the user selects one or more of Logical Extraction of user directories only; logical extraction of the entire disc or a physical extraction (bit for bit copy).

If the user has selected Logical Extraction the data search method allows for further options of where to extract files from. For example, a user can pre-select whether to extract files from any one or more of internal drives; external drives or network drives. The device of the present invention also allows for a user to pre-select a customised selection according to their requirements. A further step allows a user to select whether all users of the device are to be investigated; i.e. whether the system is to search/scan all of the personal directories on all drives or whether to select one or more pre-selected users. A user can then pre-select the file type for which Logical Extraction is to be carried out. For example a user can pre-select to extract all files or to limit the search to any one or more of possible files types, such as, picture; camera; video; P2P; chat; document; archive etc.

In the configuration stage, a user is prompted to input any required constraints with regard to the date and time of stored files or the size of files. If there are no required constraints, a user is given the option to extract all files regardless of date/time and to extract all files regardless of file size. However, if the user opts to limit the search the option to extract files from a given date/time range or a given file size range is given.

A user is able to further configure the search according to the target physical device of interest. For example, a user is prompted to select whether to search the host operating system drive only or limit the search to any one or more possible physical drives available, or even network drives. Finally, a user is given the option to save the particular search configuration for future use or to run the search immediately.

Figure 2:
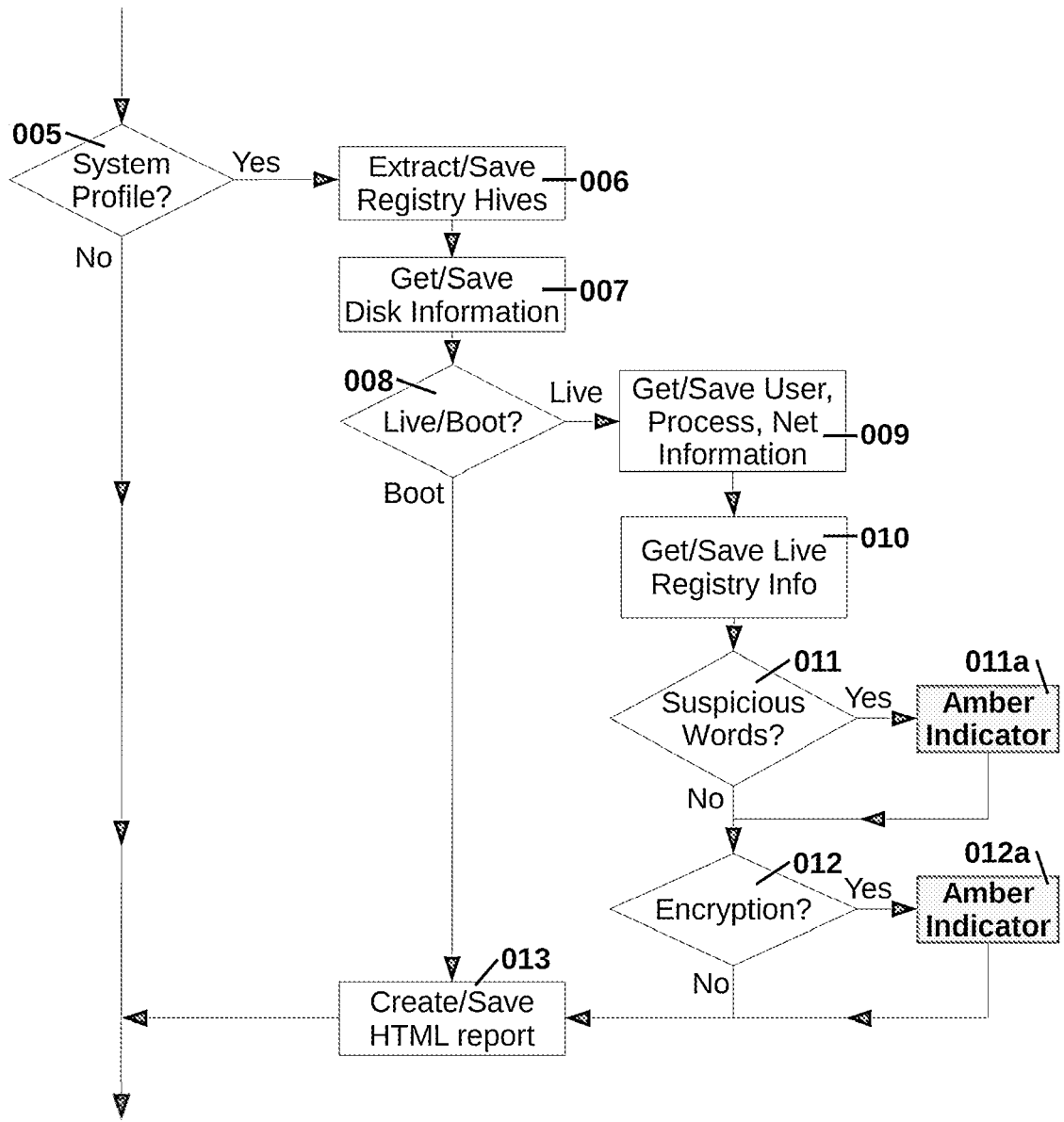
FIG. 2 is an extract of a flow diagram illustrating a second stage of the method of the present invention to obtain a system profile, continuing from the first stage shown in FIG. 1.

Referring to FIG. 1, an example of the first stage of the data search method and device is described. In use, a field device carrying the present method for computer forensic investigation is inserted into the target computer/laptop. For example, the field device is a USB drive, which is connected to the USB port of a target computer and acts as a "host" device to allow the data search method to be carried out whilst maintaining the target computer/laptop in a forensically sound state. The field device carries computer-readable instructions for carrying out the data search method. As described above, during the configuration stages, a user navigates through the configuration options and/or selects a saved searching profile. Thus, it is possible that all operational requirements are pre-determined before a user is "on site" to search a computer/digital device. By way of example, the user only needs to insert the field device and press a button to apply the data search method to the target computer/digital device. In addition to the search terms having been pre-determined and fixed; further operational requirements (RAM, external drives, network drives, logical or physical extractions) in addition to the search target data (for example, hash values, keywords, dates and times etc.) can be pre-determined. The field device also carries the pre-determined list of search values that has been pre-chosen by the user. For example, the device is configured to search for target keywords; target files; specific strings; hash values; installed programs; and file names. As described in more details with respect to FIGS. 2, 3, and 4, if a keyword is found, an amber indicator is given along with details of the match that has been found. For example, if "bomb" has been chosen as a pre-determined keyword to search for, the device will display an amber indicator if the file name "bomb threat.mp4" or "Love in Bombay.doc" is found. An amber indicator is used to show that a suspicious file, rather than an exact match, has been found. As shown in FIG. 2, an amber indicator is also used to show that data encryption has been identified. If an exact match for a specific target file is found, a red indicator is given along with details of the exact match to the target file that has been found. If the search method identifies that no target data or encryption was detected, then a user will be shown that the computer is of no concern by display of a green indicator.

The device may also be configured to search for hash values or a hash function; that is, any function that can be used to map data of arbitrary size to data of fixed size. It is understood that the values returned by the hash function can be hash values, hash codes, hash sums or simply hashes. The present invention may also use a hash table to provide a computer forensic data search for an expression search or a string relationship search. For example, to search for the keyword "fix" appearing within five words of "libor" or three words of the "%" symbol.

At the start [step 001] of the data search method, a user is shown a default screen displaying a white indicator symbol [step 002]. If the method is configured to do so, a memory extraction is performed [step 003] and the search device determines automatically whether the data search is currently being carried out in a live or a boot environment at [step 004]. It is to be understood that reference to a "live environment" indicates the state of the computer when switched on and is how the user of the device would normally view the device when in use. It is to be understood that reference to a "boot environment" indicates the state of the computer when it has been switched off and powered down; i.e. the desktop environment that gives access to the data on the computer without needing to use the installed operating system. If the computer is password protected, access to the live environment will require owner cooperation; however, access to the boot environment does not. If the data search is to be carried out in a boot environment, the user will have previously inserted a boot CD/USB and the method proceeds to [step 004b]. If the computer that is to be investigated is in a powered down state or the user has chosen to initialise the boot environment and power down the device, then the manufacturer's boot instructions are followed; for example, "press F12 during start up". In all possible data search methods the computer or digital device is powered on in a forensically sound state, by which it is understood that the data stored on the computer/digital device is unchanged by the data search method, so that the computer/digital device and the data searched and/or extracted can be relied on for evidence.

In a live environment [step 004a] the system extracts the RAM. In a boot environment [step 004b] the system extracts the hibernation file.

Referring to FIG. 2, at [step 005] in the configuration stage, the user has previously been asked whether a system profile is required. If the user has chosen to obtain a system profile, the data search method extracts all of the system profile data stored on the target device. In the use of the present invention for forensic investigations system profile data, regardless of whether or not it is suspicious, is extracted in its entirety to ensure that the data can be audited and the forensic integrity of the data is preserved, i.e. that any data submitted as evidence can be shown to be from the computer under investigation. As described below, the method continues to search all data as required by a user and saves requested data to files as shown in FIG. 2.

At [step 006] if a system profile is required, the data search method of the present invention extracts registry hives before getting disc information [step 007] and metadata is saved to a metadata database as appropriate. The method checks whether the method is to be carried out in a live or boot environment [step 008]. If the system profile is being extracted in a boot environment, the method of the present invention proceeds directly to [step 0013].

If the system profile is to be extracted in a live environment [step 009], the method obtains user information (for example, the names of all users on the computer); process information (currently running programmes and/or background processes) and network connections (both incoming and outgoing). The system then obtains at [step 010] live registry information; such as, USBs that have been inserted; MAC addresses of all devices that have been attached or are attached; IP addresses that the target device is currently connected to; currently installed programmes; commands run through "Run"; user assist data and hardware, including CPU, graphics cards, each separate section of RAM, motherboard and removable media.

Referring to FIG. 2, the system then proceeds to search the registry for suspicious words [step 011]; i.e. the predetermined target keywords, in the registry. If any such words are identified [step 011a] an amber indicator is displayed. The system also displays a message to show that "WARNING—found keywords in system profile" and lists the suspicious item that has been found. The system continues at [step 012] to search whether the target device is encrypted. The system checks for encryption systems such as BitLocker and Truecrypt. At step 012, if encryption is detected, then an amber indicator is displayed together with an appropriate message; for example, "Drive X is BitLocker encrypted", or "Truecrypt installation found".

Figure 3:
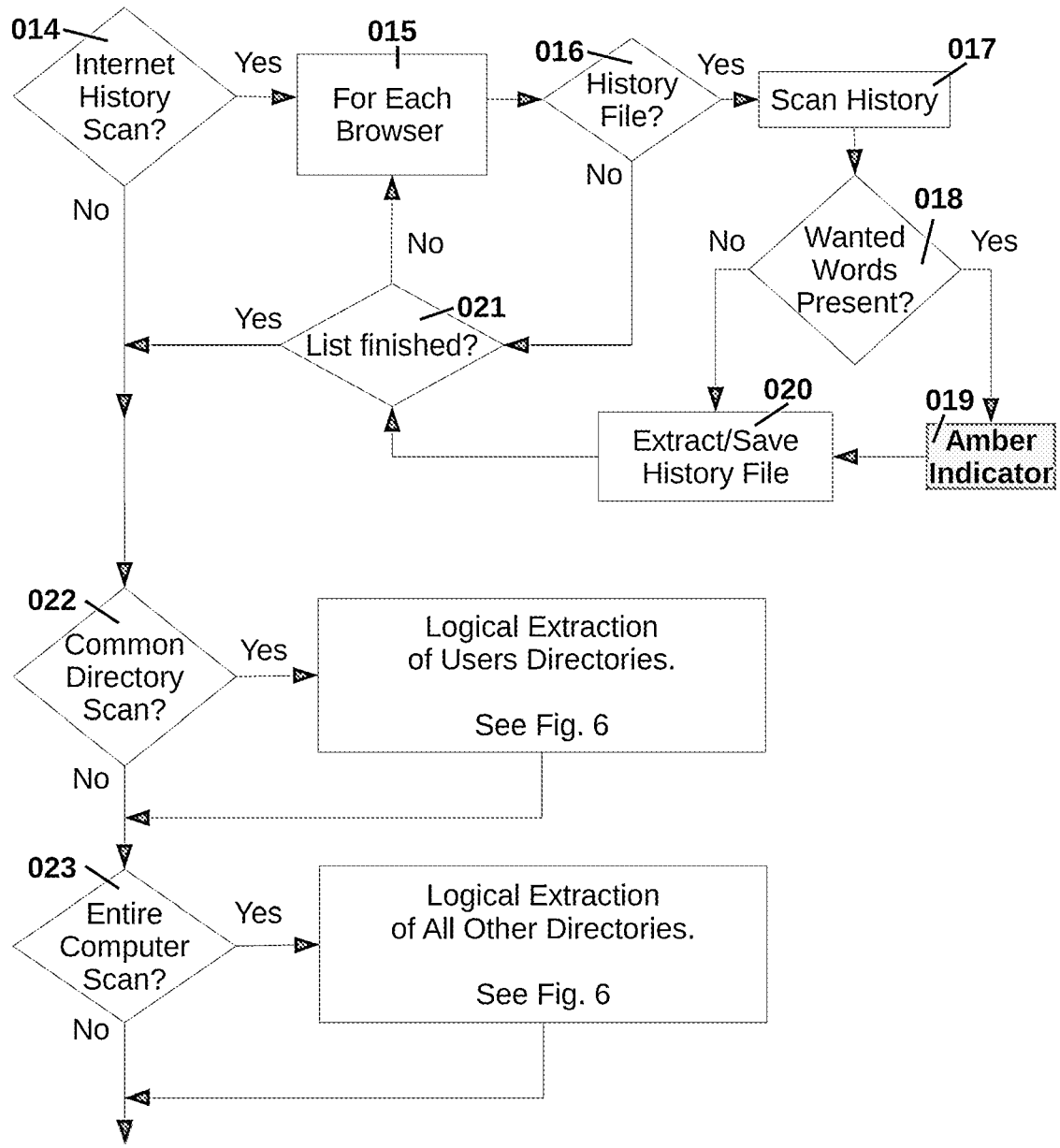
FIG. 3 is an extract of a flow diagram illustrating a third stage of the method of the present invention, continuing from the second stage shown in FIG. 2, showing the steps of internet history scan, common directory scan and entire computer scan.

At [step 013] an HTML report is created and saved to summarise the system profile. In a preferred embodiment of the present invention, the results are formatted in a webpage for convenient reading and forwarding. Referring to FIG. 3, the method then proceeds to confirm to the user that it is carrying out an internet history scan. If the search device has been configured to carry out an internet history scan, the method proceeds to search the target device's internet history at [step 014]. The internet history is scanned for the pre-determined target keywords/files; for example, within each web browser such as Chrome™, Firefox®, Skype™, Opera™ and Internet Explorer® programs [step 015]. The data search method checks at [step 016] whether a history file exists and, if it does, at [step 017] proceeds to scan the contents of the history file to establish at [step 018] whether the file contains any of the pre-determined target keywords. The system searches history files including websites visited; downloaded files; search terms; URLs; chat history (e.g. Skype) and related metadata, and obtains data including the date that the site was last visited and the number of times the site was visited.

If keywords are detected [step 019] an amber indicator is displayed to the user, however the system saves the entire history file [step 020] to the field device. The system continues searching and extracting the history files (one for each installed browser) at [steps 018, 019, 020] until each (supported) browser installed on the target device has had its history file searched and extracted. Extracting the entirety of each history file allows an analyst to analyse the information later, in greater detail, as required.

The method then proceeds to confirm whether the user has elected in the configuration stage to carry out a directory scan. If this option is required, at [step 022], the method proceeds to carry out the common directory scan depending on the user's pre-determined configuration. The system searches directories starting with the top level directory; for example, "C:/users/(user name)", for every user specified by the user; or if not specified, a default search for all users. The system searches through each user's personal file directories and indicates if any target data keywords have been detected by displaying an amber indicator or if a target file match has been detected by displaying a red indicator. The system also adds any matches to a list reporting any suspicious words/files that have been identified. This live update list or log constantly notifies the user of the stage that the search method has reached and provides details of any matches found together with a category of match, as pre-determined by the user. The log of matched files then later allows for extraction of only the files that match the user's pre-determined target keywords or target files.

As an alternative, or in addition to, the Common Directory Scan, the system then proceeds, according to a user's requirements as pre-set in the configuration stage, to carry out an Entire Computer Scan at [step 023] to perform logical extraction of all directories on the target computer, excluding directories already scanned during the Common Directory Scan [step 022]. The logical extraction is described in more detail with respect to FIG. 6. As previously described, the system searches for the pre-determined keywords or files and indicates whether target data or encryption has been found by displaying a red or amber indicator respectively, as appropriate. The system also adds any matches to the log listing a report of suspicious words/files that have been identified. This later allows for only the target keyword or target data to be extracted, which significantly reduces the time involved in extracting target data.

Figure 4:
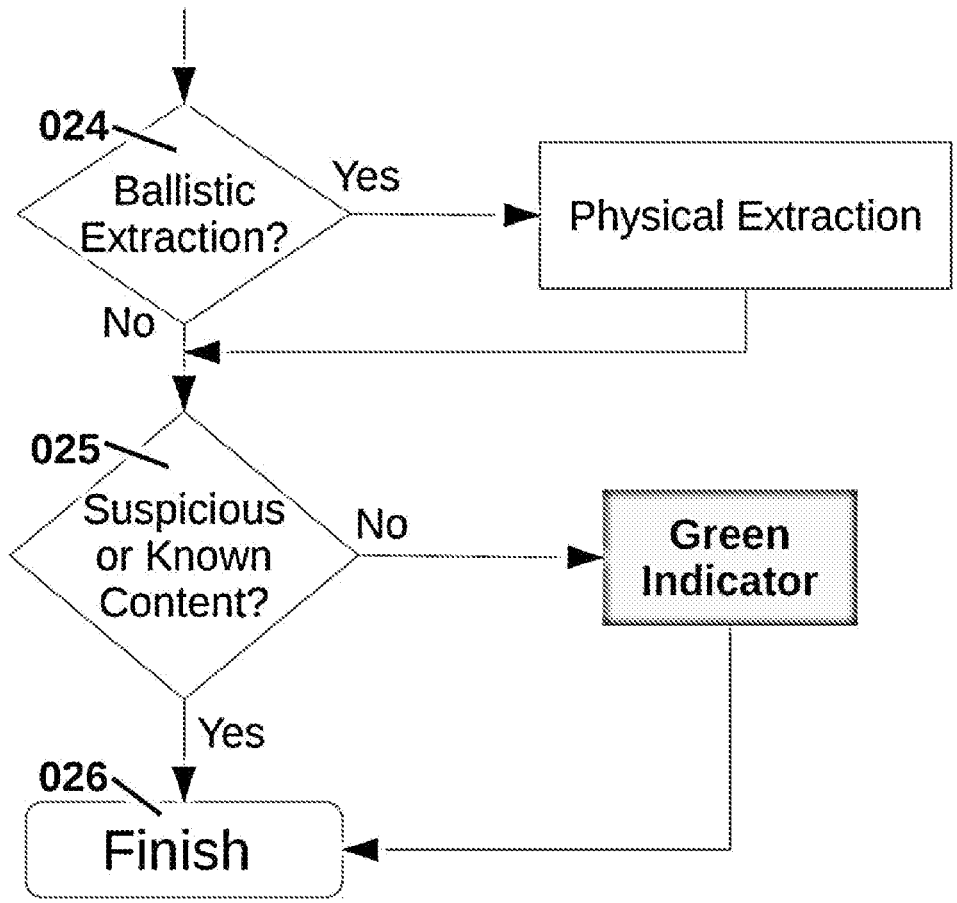
FIG. 4 is an extract of a flow diagram illustrating a fourth and final stage of the method of the present invention, continuing from the third stage shown in FIG. 3, showing the steps of physical data extraction.

Referring to FIG. 4, if required, the method then continues at [step 024] to perform a physical extraction of all data, including the target matched data or target keyword data. At [step 025], if no target data matches or target keywords have been found a green indicator is displayed. As shown at step 026, the method finishes when all necessary extraction and all tasks of the method steps [002] to [025] are completed.

Figure 5:
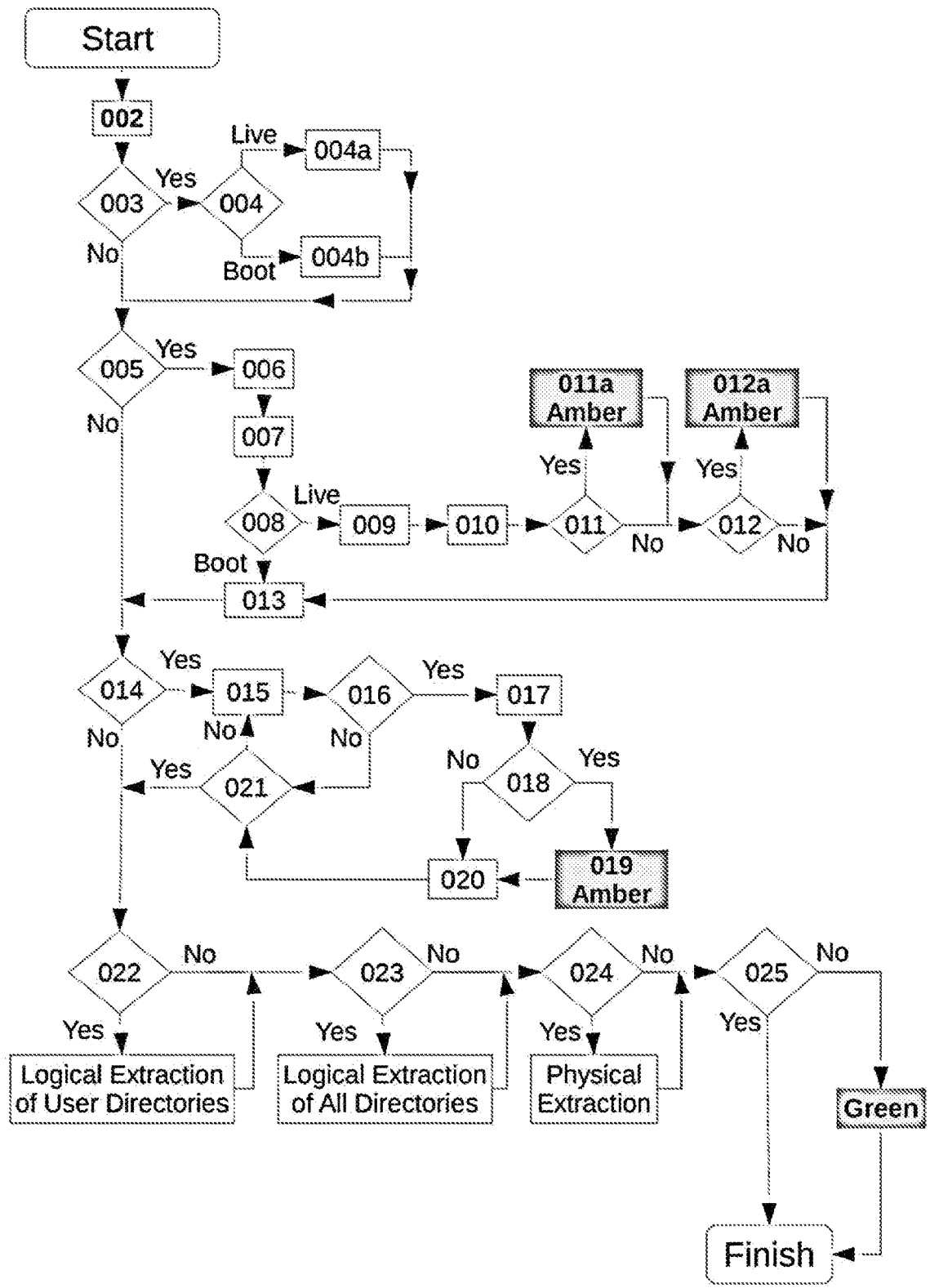
FIG. 5 is flow diagram illustrating the complete method of the present invention, incorporating all of the four stages of the method of the present invention shown in FIGS. 1 to 4.

Referring to FIG. 5 an overall flow chart showing the full method of the present invention incorporating the steps shown in FIGS. 1 to 4 is shown.

Figure 6:
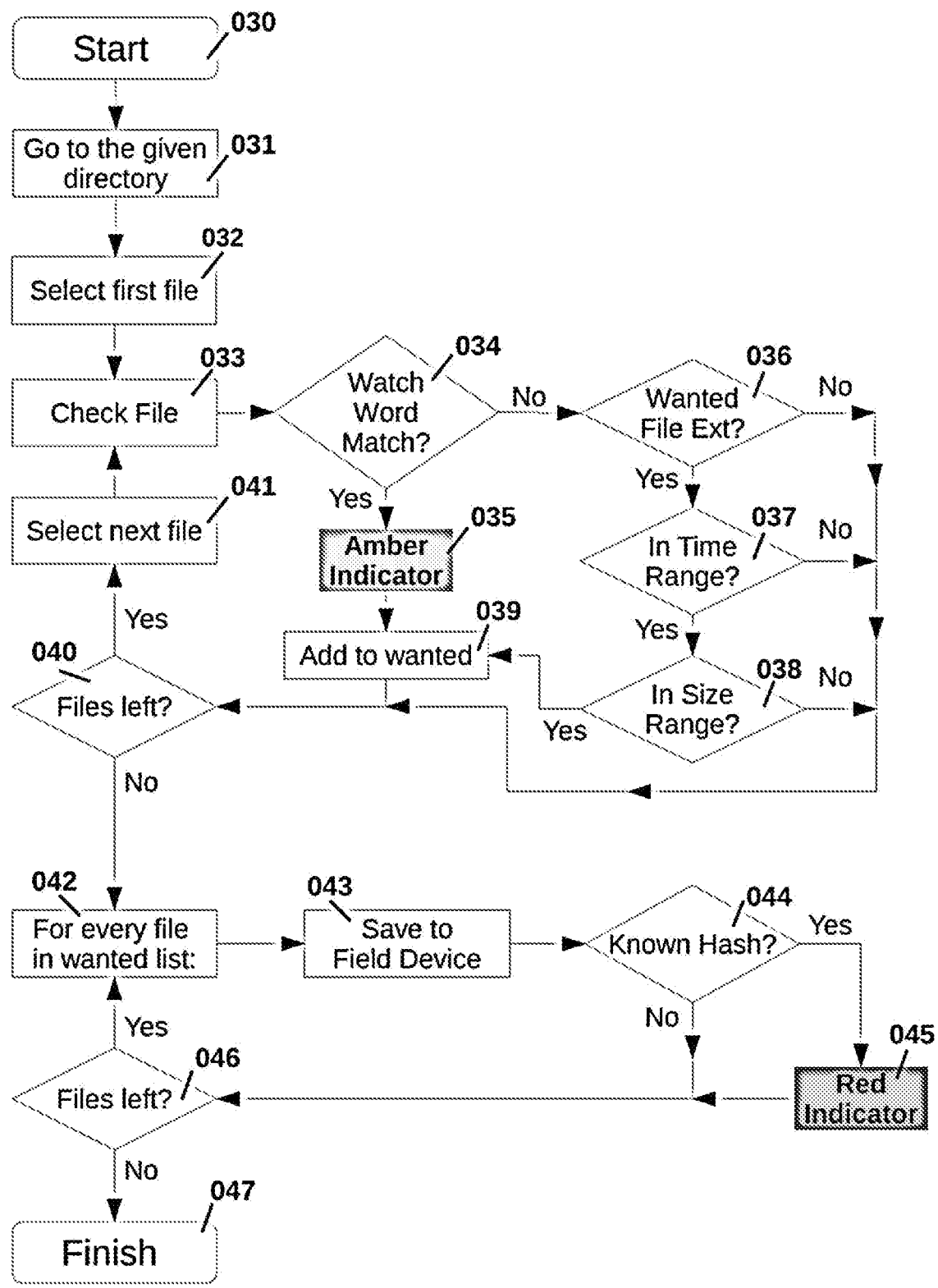
FIG. 6 is a flow diagram illustrating the search method of an embodiment of the present invention.

Referring to FIG. 6, the logical search scanning method of the present invention is described in more detail. The data is searched by scanning through files in a logical structure comparable to how the files appear to the end user. To start the scanning method at [step 030], the pre-determined target keywords and target files selected during the configuration stage are used. The list of target criteria includes the file type and the groups of "target extensions"; for example, picture, video or archive extension or a custom extension chosen for searching by the user. The data search method also uses the further pre-determined criteria that were selected in the configuration stage to allow a user to specify a range of time within which to search; i.e. a time range to investigate whether modifications or creations of new files have occurred; or to specify a file, i.e. a file size that is smaller than or greater than a pre-determined size.

The logical search scanning method starts at [step 030] and navigates at [step 031] to the top level directory and, at [step 032] selects the first file found. At [step 033], the system starts checking the file and checks, at [step 034], whether the file name contains a target keyword. If the file does contain a target keyword an amber indicator is displayed to alert the user at [step 035] and report in the system log that a match has been founds. If the file does not contain a target keyword, at [step 036], the system asks whether the file has a target, i.e. wanted, extension. The system checks for extensions from a pre-determined list, for example, picture, video, or archive extension. The list can include custom extensions, which are added to the search list when configuring the search system of the present invention. If the file does contain a target; i.e. "wanted" extension, at [step 037], the systems asks whether the file is within a pre-specified time range. The target time range is pre-determined and added to the system at the configuration stage according to a user's requirements and allows a user to find a file that has been modified or created within a specific time range. If no time range is pre-set the system defaults to find files from "all times". At [step 038], the method proceeds to confirm whether the target file is within a pre-determined size range. The pre-determined file size is included at the configuration stage and, if no particular file size is to be searched for, the default file size is "all sizes".

At [step 039] if target files are found matching the pre-configured criteria at any or all of steps 034, 036, 037 or 038 then the files are noted in a "wanted list" at [step 039]. The search process of [step 033] to [step 039] continues until all files have been searched and all matches identified. The method proceeds through all files, selecting the next file at [step 041] in a logical process comparable to how the files appear to the end user.

At [step 040] when there are no files left the method proceeds through every file in the wanted list at [step 042] and, at [step 043], proceeds to copy each file to the removable field device. By extracting only the matched files from the wanted list, the time to extract data is significantly reduced. The data in each file is copied and encrypted to prevent further copying and ensures that should the device on which the data is stored, be lost or stolen, then the data is not compromised. Each target matched file's metadata is also copied, including the file name; file size; data and/or time of modification and/or creation; and the hash values such as MD5/SHA1 hashes. Copying of the metadata allows for advanced investigations such as the files being mapped during any necessary further analysis. At [step 044] the system checks whether the hash values of the copied files are in a known, pre-determined hash database. If a positive match is found, at [step 045], the user is alerted by the system displaying a red indicator. Details of the reason for the alert are also displayed to the user. The copying of each file continues until at [step 046] the system indicates that there are no files left and the method, at [step 047], finishes.

On completion of the search method, all data/digital memory has been extracted and searched, according to the user's pre-configured, fixed search requirements; for example, to identify target data, encryption and/or any use of target keywords. The user is provided with one or more alerts according to their search requirements and is also provided with a description of the reason for the alert. If required the alerts are also categorised; for example that the match is "suspicious" or that the match falls within "Category 9" etc. This significantly reduces the amount of post-extraction analysis that needs to subsequently be carried out on the forensically intact data/digital memory that has been extracted. The indicator will display the highest level of alert identified within the extraction at any point.

The above described embodiments have been given by way of example only, and the skilled reader will naturally appreciate that many variations could be made thereto without departing from the scope of the claims.

It is also to be understood that the following claims are to cover all generic and specific features of the invention described herein, and all statements of the scope of the invention which, as a matter of language, might be said to fall therebetween.

The invention claimed is:

1. A data search method for computer forensic investigation comprising:
inputting at least one pre-determined search term and at least one pre-determined list of categories different than the at least one pre-determined search term, wherein some of the pre-determined categories are associated with a pre-determined first indicator color and some other of the pre-determined categories are associate with a second indicator color;

displaying a white indicator color;

searching a computer or digital device that is powered on in a forensic examination for data matching one or more of the at least one pre-determined search terms to identify the presence of target data in one or more of file names, strings, hash values or hash functions, installed programs, MAC and IP addresses, and metadata without making a complete image of all the data on the computer or digital device;

categorizing any identified target data according to the pre-determined list of categories;

updating a list or log when any target data matching the at least one pre-determined search term are found; and, changing the displayed indicator from white to one of the first color, the second color, or a third color, wherein the display is changed to the first color if any identified target data is categorized in the pre-determined category associated with the first color, to the second color if any identified target data is categorized in the pre-determined category associated with the second color, or to the third color if no target data is identified in either of the first or second pre-determined categories;

wherein categorizing the identified target data and displaying the indicator color are done simultaneously with identifying the target data.

2. A data search method according to claim 1, wherein the computer or digital device is one of a personal computer, a laptop computer, a tablet computer, and a smart phone.

3. A data search method according to claim 1, wherein the at least one pre-determined search term includes one or more of a keyword, a file date, a file time, a file size, and a hash value.

4. A data search method according to claim 1, wherein categorizing the identified target data according to the pre-determined list of categories further comprises categorizing the target data and using a traffic lights indicator having a red, an amber, and a green indicator.

5. A data search method according to claim 1, wherein searching the computer or the digital device leaves the computer or the digital device in a condition that is identical to its condition prior to the searching.

6. A data search method according to claim 1, wherein searching the computer or digital device includes searching for the target data which is stored on any one of a hard disc, a flash memory, a random-access memory (RAM) and a CPU cache.

7. A data search method according to claim 1, further comprising extracting the identified target data to one or more removable data storage devices.

8. A data search method according to claim 1, further comprising ranking the identified target data according to the pre-determined hierarchy of categories.

9. A data search device for computer forensic investigation comprising:

an input device;

a display configured to display an indicator with at least a white, amber, red, or green color;

an inputted at least one pre-determined search term and at least one pre-determined list of categories different than the at least one pre-determined search term, wherein some of the pre-determined categories are associated with the amber color indicator and some other of the pre-determined categories are associate with the red color indicator; and a search subsystem comprising processor-executable software stored on a storage media device, the software adapted for, searching a computer or a digital device that is powered on in a forensic examination for data matching one or more of the at least one pre-determined search terms to identify target data in one or more of file names, strings, hash values, hash functions, installed programs, MAC and IP addresses, and metadata without making an image of all the data on the computer or digital device, categorizing the identified target data according to the pre-determined list of categories, and changing the displayed indicator from the white color indicator to one of the amber, red, or green color, wherein the display is changed to amber if any identified target data is categorized in the amber pre-determined category, to red if any identified target data is categorized in the red pre-determined category, or to green if no target data is identified in either of the amber or red pre-determined categories, wherein categorizing the identified target data and changing the displayed indicator color are done simultaneously with identifying the target data.

10. A data search device according to claim 9, wherein the search subsystem further comprising an extractor for extracting the target data to one or more removable storage devices.

11. A data search device according to claim 9, wherein the software is further adapted for initially displaying the white indicator color before searching, and displaying the amber or red indicator color according to the category from the at least one pre-determined list of categories the identified target data is categorized in.

12. A method for reducing the time to forensically determine whether one or more target devices contains target data, comprising:

providing a set of pre-determined search terms and a set of pre-determined categories different than the pre-determined search terms, wherein each of the pre-determined categories is associated with corresponding ones of a set of pre-determined rankings;

displaying a first visual indicator upon an initiation of a search;

executing a software stored on a storage medium for searching, using at least the set of pre-determined search terms, one or more of a file name, a string, a hash value, a hash function, an installed program, a MAC address, an IP addresses, and a metadata of or associated with the target device after it is powered on in a forensic examination to identify the presence of the target data, categorizing the identified target data according to the pre-determined categories, and updating a list or log when any data matches are found, wherein the searching is performed without making an image of all the data on the computer or digital device; and displaying a second visual indication of the presence of the target data as soon as it is found on the target device, where the visual indication includes outputting a color based on the rank-ordered categorizing of the identified target data, or displaying a third visual indication if the presence of the target data is not found on the target device.

13. A method according to claim 12, wherein the displayed visual indication is one of, (i) a color red when the target data is categorized in a category associated with a highest pre-determined rank, (ii) a color amber when the target data is categorized in a category associated with less than the highest pre-determined rank but greater than a lowest pre-determined rank, and (iii) a color green when the target data is categorized in a category associated with the lowest pre-determined rank or no target data is found.

14. A method according to claim 12, further comprising:
inputting an extraction command for causing the identified target data to be extracted from the target device to one or more removable data storage devices connected to the target device such that the extracted target data is identical to the target data on the target device.

15. A method according to claim 12, wherein the target device is one of a desktop computer, a laptop computer, a tablet computer, and a smart phone.

* * * * *